United States Patent [19]
Dienst

[11] Patent Number: 5,044,757
[45] Date of Patent: * Sep. 3, 1991

[54] EXTRUSION DEVICE FOR INCORPORATING ADDITIVES

[75] Inventor: Manfred Dienst, Burgdorf, Fed. Rep. of Germany

[73] Assignee: Hermann, Berstorff Maschinenbaum GmbH, Hanover, Fed. Rep. of Germany

[*] Notice: The portion of the term of this patent subsequent to Jul. 10, 2007 has been disclaimed.

[21] Appl. No.: 447,853

[22] Filed: Dec. 8, 1989

[30] Foreign Application Priority Data

Dec. 10, 1988 [DE] Fed. Rep. of Germany ....... 3841728

[51] Int. Cl.$^5$ .............................................. B28C 7/04
[52] U.S. Cl. .................... 366/76; 264/211.230; 264/349; 425/204; 425/208; 366/82; 366/85; 366/90; 366/319; 366/322
[58] Field of Search ............... 425/208, 204, 203, 205, 425/206, 207; 264/211.21, 211.23, 349; 366/82, 90, 76, 322, 319, 83, 84, 85

[56] References Cited

U.S. PATENT DOCUMENTS

| Re. 23,948 | 2/1955 | Fuller | 425/86 |
| 963,122 | 7/1910 | Damon | 366/319 X |
| 3,453,356 | 7/1969 | Kent, Jr. et al. | 264/143 |
| 3,608,868 | 9/1971 | Koch | 366/82 |
| 3,729,178 | 4/1973 | Stade | 366/84 |
| 3,779,522 | 12/1973 | Loomans | 366/83 X |
| 4,099,897 | 7/1978 | Takano et al. | 425/208 X |
| 4,320,041 | 3/1982 | Abe et al. | 264/349 X |
| 4,347,003 | 8/1982 | Anders | 366/75 |
| 4,423,960 | 1/1984 | Anders | 366/75 |
| 4,534,652 | 8/1985 | Stade | 366/85 |
| 4,679,498 | 7/1987 | Chaveron et al. | 366/75 |
| 4,729,666 | 3/1988 | Takubo | 425/208 X |
| 4,752,135 | 6/1988 | Loomans | 366/75 |
| 4,875,847 | 10/1989 | Wenger et al. | 425/208 |
| 4,895,688 | 1/1990 | Shigetani | 264/211.23 X |
| 4,940,329 | 7/1990 | Dienst | 425/204 |

FOREIGN PATENT DOCUMENTS

| 1416667 | 9/1965 | France | 425/204 |
| 57-22032 | 2/1982 | Japan | 264/211.23 |

Primary Examiner—Jay H. Woo
Assistant Examiner—Robert B. Davis
Attorney, Agent, or Firm—Foley & Lardner

[57] ABSTRACT

A single or twin-screw device is used to incorporate additives in a thermoplastic plastics material melt. The or each barrel of the extruder includes a first feed aperture for the introduction of the melt and a second feed aperture downstream thereof for the introduction of the additives. A screw is mounted on a shaft in each barrel and includes a core and a helical flight. In the region of the second feed aperture, the flight is replaced by alternating disc members and spacer members mounted on the shaft. The diameter or major dimension of the disc members is approximately equal to the combined diameter of the screw core and its flight while the diameter of the spacer members is approximately equal to that of the screw core. The disc members have profiled downstream faces. The disc and spacing members increase mixing and consequently throughput in the region of the second feed aperture.

8 Claims, 3 Drawing Sheets

EXTRUSION DEVICE FOR INCORPORATING ADDITIVES

FIELD OF THE INVENTION

The present invention relates to an extrusion device. More particularly, the present invention relates to an extrusion device in which pulverulent or fibrous additives can be admixed with a fused thermoplastic plastics material.

BACKGROUND OF THE INVENTION AND PRIOR ART DISCUSSION

In U.S. Pat. No. 3,453,356, there is disclosed a twin-screw extrusion device in which additives can be admixed with a fused thermoplastic plastics material. In this prior art arrangement, a thermoplastic plastics material is introduced into an extruder barrel first through a feed aperture and is then fused. Pulverized glass fibers are then introduced into the fused plastics material through a second feed aperture disposed downstream of the first feed aperture.

Helical flights are provided around the extrusion screw disposed in the second feed aperture. Such flights occupy a large proportion of the internal volume of the barrel. The conveying of material in an extrusion device is brought about by the adhesion of the melt to the interior wall of the barrel and, substantially simultaneously the melt is scraped from such wall by the helical flight on the screw. It is generally true to say that the better the material adheres to the interior wall of the barrel, the better the conveying capacity of the helical screw flights conveying the material.

Since a considerable portion of the internal surface of the barrel which assists in conveying the material is absent in the area occupied by the second feed aperture, the conveyance of material is often very unsatisfactory in this particular region of the extrusion device. A large proportion of the molten material remains in the screw threads and acts as a block or undergoes laminar flow without performing a rolling movement on the internal wall of the barrel.

There is an increasing demand for plastics materials having differing properties. Special additives, such as carbon black in the form of powder or fibers and the like, are required to be mixed with the plastics material in order to impart the desired properties to the latter. Considerable problems are involved in, for example, mixing free carbon black in powder form with molten polymers and also in obtaining a mixture which is highly homogeneous. Absolute homogeneity is of prime importance particularly when a thin foil, having a thickness of, for example 25 m$\mu$, has to be produced from the mixed plastics material.

On the other hand, even from an extruder used for producing specialist plastics materials, a high output is of great financial importance because the capital outlay necessitated by such an extrusion system is very high. Hitherto, very long extruders have been used to obtain satisfactory homogeneity of the mixture of plastics material and additives. In theory, increasing the length of the extrusion device prolongs the mixing time and this improves the homogeneity. However, increasing the length of the extrusion device increases the capital outlay more than would be expected.

OBJECT OF THE INVENTION

The present invention seeks to provide a single-screw or twin-screw extrusion device in which additives may be admixed with a fused mass of thermoplastic plastics material to produce a highly homogeneous mixture but without the need to recourse to an expensive, complex screw construction or to the use of an excessively long extrusion device. The invention also seeks to provide an extrusion device in which the homogenization is improved, even in the case of materials hitherto regarded as difficult to mix, such as highly viscous plastics materials and free carbon black.

SUMMARY OF THE INVENTION

According to the present invention, there is provided an extrusion device for incorporating pulverulent or fibrous additives in a melt of a thermoplastic plastics material, the device comprising at least one screw rotatably mounted on an axial shaft in a barrel, each screw having a helical flight disposed around a central core, a feed aperture for granular plastics material an intake zone and a metering zone in which the plastics material is fused, and a second feed aperture for supplying the additive to the molten plastics material, wherein the flight on each screw is discontinuous in the region of the second feed opening, each shaft, in the region of said second feed aperture, having a plurality of disc members mounted thereon, the disc members extending substantially parallel to one another and being spaced from one another by circular spacer discs, the disc members each having a downstream face which is profiled to produce a conveying effect in a downstream direction and each having an external diameter corresponding substantially to the diameter of the combines screw core and flight, the spacer discs each having a diameter corresponding substantially to the core diameter of the screw, and wherein the disc members and the spacer discs each have a thickness which lies in the range of 0.1 to 1.5 tiles the diameter of the screw.

The arrangement of the disc members which are profiled to produce a conveying effect on the melt in the desired direction in the region beneath the feed aperture for the additive or additives results in conveyance of the melt in this region despite the absence of a screw flight in this region. If, for example, the teaching of the present invention is employed in a twin-screw extrusion device, the melt is caused to flow from the free space between the disc members associated with one screw to the space between the disc members associated with the adjacent screw. Thus, the melt and additives are mixed both in a longitudinal and in a transverse direction.

A pulverulent additive is thus immediately drawn into the melt, and is subjected to a first mixing therewith by means of the disc members. In a preferred embodiment, the disc members have helical teeth formed on their downstream surfaces, such teeth being formed by cutting helical grooves in the peripheral surfaces. These teeth on the backs of the disc members force the melt and the pulverulent additive into the space between two adjacent discs. The space is formed by providing spacer discs between each pair of disc members, which spacer discs have a diameter corresponding substantially to the diameter of the screw core in the filling region of the extrusion device. In the case of twin-screw devices, the core diameter of the two screws is generally uniform over the entire length of the screw. In the case of a single-screw extrusion device, the core diameter of the screws generally increases from the metering zone in the downstream direction.

Pulverulent or fibrous additives are introduced into the melt through the second feed aperture. The intake of the additive material is effected immediately with unexpectedly good intermixing. The conveying capacity of the extruder is also unexpectedly increased compared with known extrusion devices which have helical flights on the screw or screws in the region of the second feed aperture. The increased conveying capacity is probably attributable to the fact that the otherwise customary laminar flow in the worm threads is broken up in the region of the second feed aperture and there is therefore no conveying of the melt without the melt being rolled against the interior wall of the barrel in which the screw or screws are rotatably mounted. Conveying and mixing of the material also take places below the feed aperture as a result of the disc members having profiled downstream surfaces.

Preferably, the second feed aperture for the pulverulent or fibrous additives has a length which lies in the range of 0.5 to 3 times the diameter of the screw.

Desirably, two screws each mounted on a separate shaft are provided, each shaft carrying, alternately in the direction of conveyance of the melt, disc members and spacer discs, wherein the disc members on one shaft intermesh with the spacer discs on the other shaft, and the spacer discs on one shaft are aligned with the disc members of the other shaft.

In such an embodiment, the staggered arrangement of the disc members and the spacer discs associated with one screw relative to the disc members and spacer discs associated with the other screw results in the melt and the additives being conveyed, in each case, in the desired direction of conveyance. By virtue of the profiled downstream forces of the disc members, the melt passes into the free space between the spacer discs associated with one screw and the interior wall of the barrel. It then passes into the space between the spacer disc on the other screw and the wall of the barrel. In other words, the melt is conveyed from one free space to the next, the two free spaces being substantially diametrically opposed to one another but being slightly offset from one another in the direction of conveyance. This causes the additives to be drawn into the melt very rapidly.

The melt is conveyed by the helical teeth on the downstream faces of the disc members. The mixture is at the same time rolled out, or broken up to form very thin layers, whereby the intake of pulverulent or fibrous additives into the mixture is further enhanced. The flow of melt is broken up and relayered by each such tooth.

Excellent intake of the solid particles is achieved as a result of this multiple relayering of all the constituents, particularly in the case of highly viscous plastics materials which are difficult to intermix.

The disc members may be circular, two-pointed or substantially ellipsoid, or three-pointed or substantially triangular. If they are circular, they may be eccentrically mounted on their associated shaft.

BRIEF DESCRIPTION OF THE DRAWINGS

Various embodiments of an extrusion device in accordance with the present invention will be further described, by way of example, with reference to the accompanying drawings, in which.

DESCRIPTION OF PREFERRED EMBODIMENTS

Figure 1:
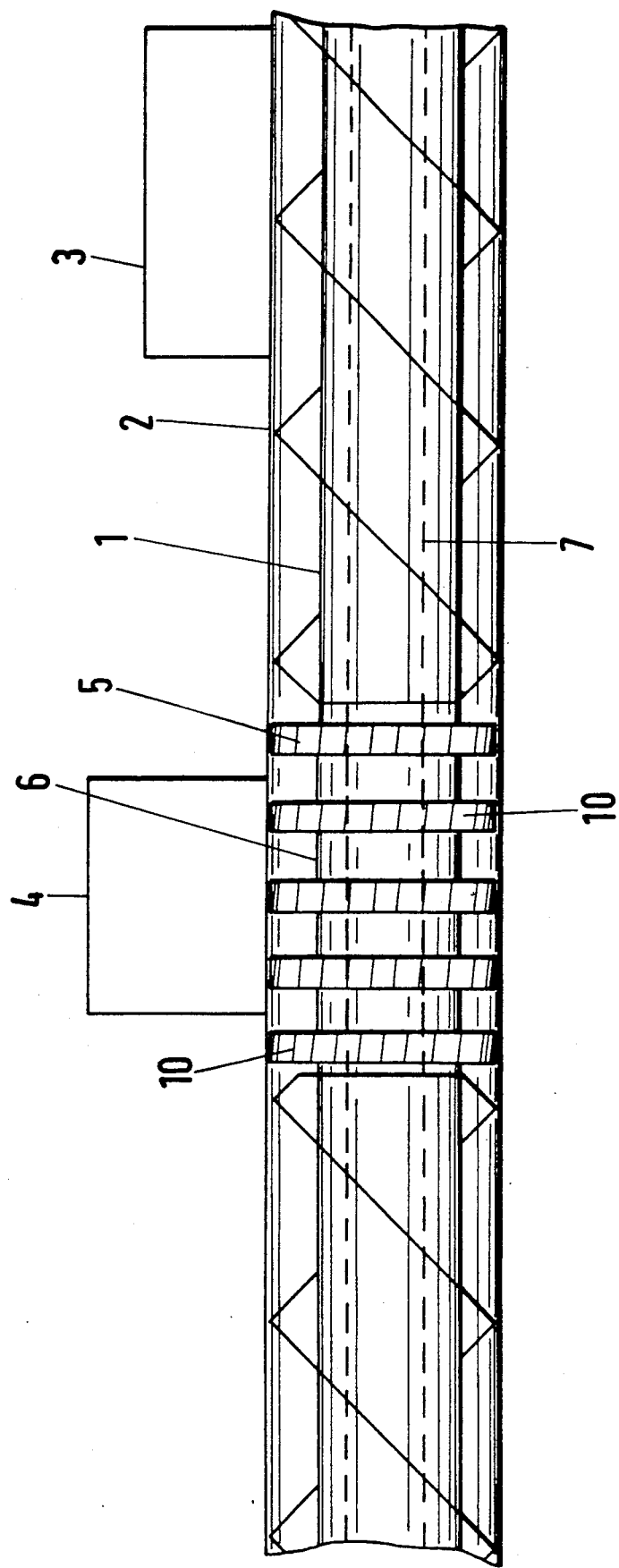
FIG. 1 is a vertical longitudinal sectional view of a single-screw extrusion device in accordance with the present invention.

In FIG. 1 there is shown an extrusion device comprising a single screw 1 mounted for rotation in a barrel 2. Two filling apertures 3 and 4 are provided in the barrel 2 for the introduction of a thermoplastic plastics material into the barrel.

The screw has, as is customary, a helical flight disposed around a central core.

Figure 4:
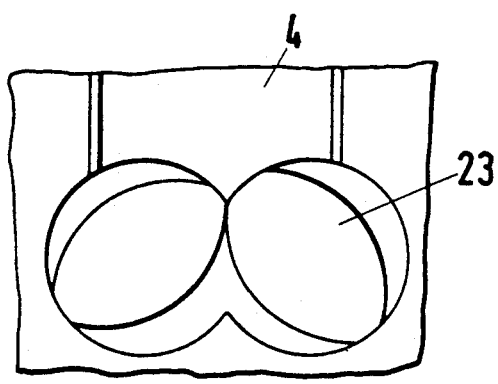
FIG. 4 is a cross-sectional view similar to that shown in FIG. 3 but of an alternative embodiment of the present invention.
Figure 5:
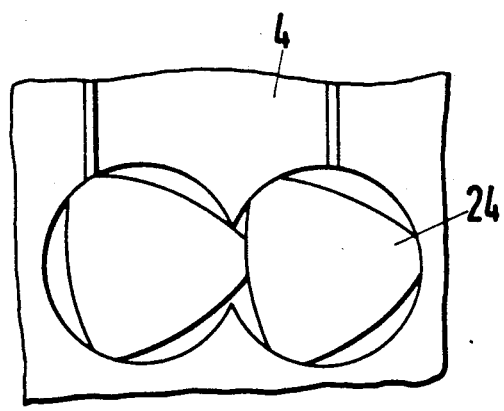
FIG. 5 is a cross-sectional view similar to that shown in FIGS. 3 and 4 but of a further alternative embodiment of a device in accordance with the present invention.
Figure 6:
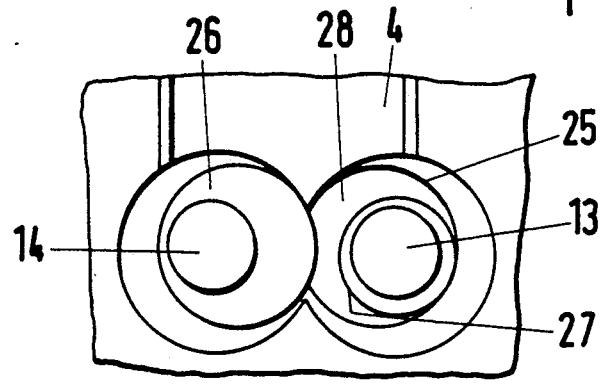
FIG. 6 is a cross-sectional view similar to that shown in FIGS. 3 to 5 but of a still further embodiment of a device in accordance with the present invention.

In the region thereof below the filling aperture 4, the helical flight of the screw is replaced by a plurality of discs 5. These discs 5 may be produced either by milling a cylindrical spindle 7 or may be formed as individual discs 5 which are slipped onto the axially extending spindle 7. Circular spacer discs 6 are disposed between the pair of adjacent discs 5 located on the spindle 7. The discs may be circular in cross-section or angular, as is shown in FIGS. 3 and 6 or may have different shapes as shown in FIGS. 4 and 5.

Figure 2:
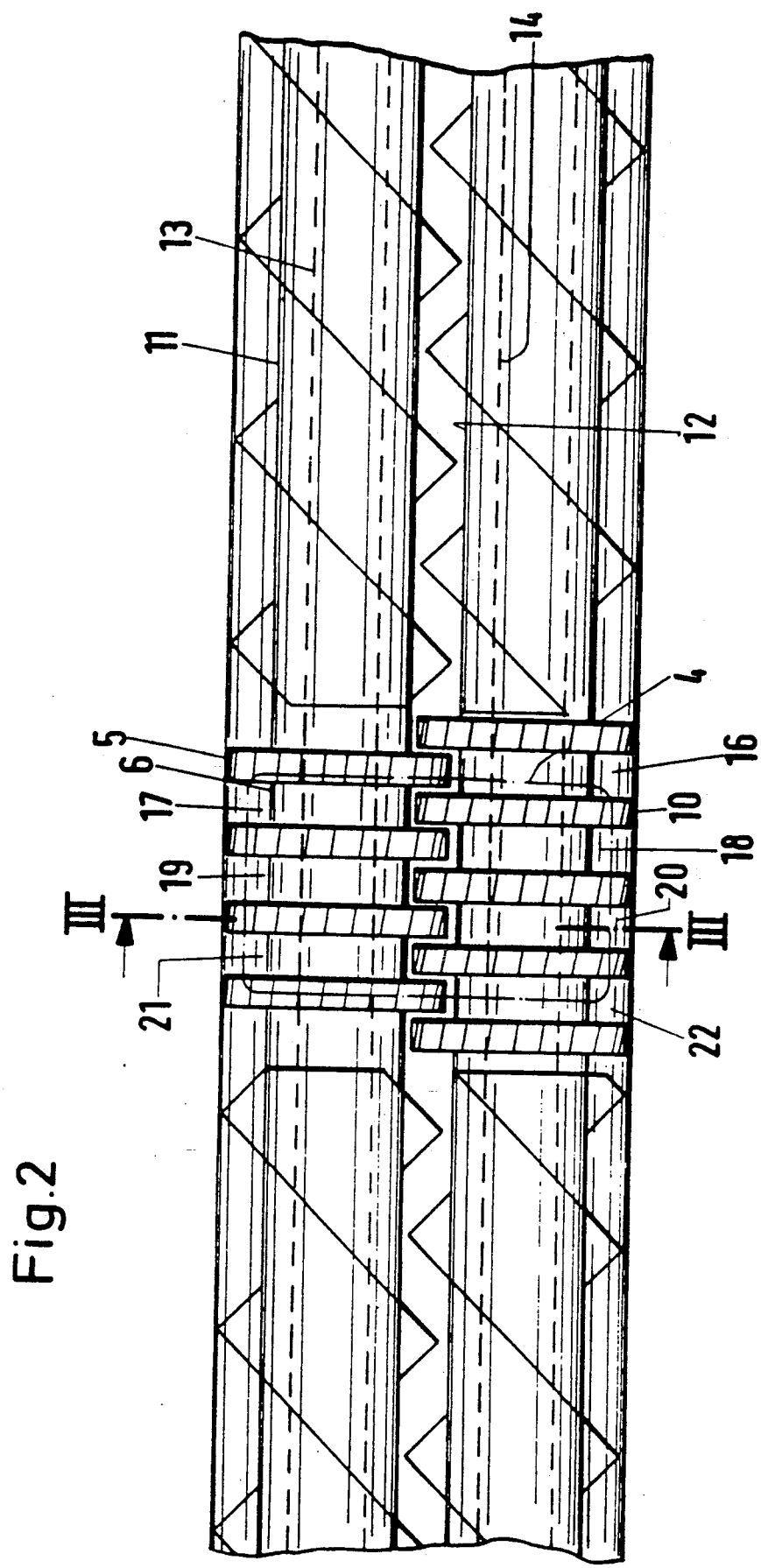
FIG. 2 is a top plan view of a twin-screw extrusion device in accordance with the present invention.
Figure 3:
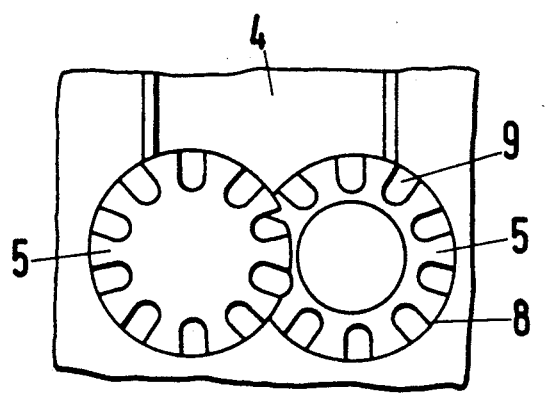
FIG. 3 is a cross-sectional view, generally taken along the line III—III of FIG. 2 but showing a slight modification with respect thereto.

FIG. 3 is a cross-sectional view taken generally along the line III—III of FIG. 2. As shown in FIG. 3, the downstream faces 8 of the discs 5 have a profiling formed by the provision of axially extending grooves 9 formed around the periphery of the discs 5. The grooves 9 extend axially with respect to the longitudinal axis of the screw. In the embodiment shown in FIGS. 1 and 2, the peripheral faces of the discs 5 have obliquely extending grooves 10 which result in a conveying action being produced by the discs 5.

FIG. 2 is a plan view of a twin-screw extrusion device in which two screws 11 and 12 are mounted in a barrel and are journalled to rotate in the same direction as one another. The screws 11 and 12 comprise individual parts mounted on spindles 13 and 14 respectively. Alternatively, the screws 11 and 12 could each also be made in one piece from a solid cylinder.

In the FIG. 2 embodiment, discs 5 are again alternated with spacer discs 6 below the second filling aperture 4, as is the case in the FIG. 1 embodiment. Moreover, spaces are defined between the discs 5 and the spacer discs 6 in both embodiments but these are only referenced, as 16 to 22 inclusive, in FIG. 2.

A plastics material in the form of a melt is conveyed into the furthest upstream space 16 by the screw parts 11 and 12. The melt then flows into the succeeding space 17 which is disposed diametrically opposed to the space 16 but slightly offset downstream with respect thereto. The flow of the melt is caused by the pressure of the melt upstream. The melt strikes the backs of the discs and then enters the peripheral grooves 10.

The melt then successively enters the spaces 18 to 22 inclusive through the respective grooves 10. Thus, the melt is conveyed from one peripheral region of the interior of the barrel to the opposed peripheral region while still having a component of downstream motion. It is therefore transferred from the screw disposed on the spindle 13 to the screw disposed on the spindle 14, and vice versa on a plurality of occasions so that very thin layers of melt are formed. This results in excellent longitudinal and transverse mixing.

The flow blockages which, in the prior art, are observed below a feed aperture, and which are caused by the absence of the interior surface of the barrel in the region of the feed aperture are avoided. Continuous relayering of the melt is effected by the discs and new mixing surfaces are defined. The conveyance of the melt is unexpectedly good as a result of the construction, in accordance with the invention, of the screw sections below the second feed aperture 4. This is despite the fact that the area of the feed aperture inevitably means that a portion of the interior surface of the barrel is lost for the conveying operation. An increase in the output of the extrusion device of the present invention compared with prior art devices is achieved, particularly in the case of highly viscous plastics material melts.

Further embodiments of the discs are shown in FIGS. 4 to 6. So-called two-point or ellipsoid discs 23 and three-point or substantially triangular discs 24 are shown in FIGS. 4 and 5 respectively. These contact one another during rotation and therefore have a high self-cleaning effect. The mixture being extruded is rolled out in thin layers, so that an enhanced mixing effect is achieved.

FIG. 6 shows circular discs 25,26 similar to those shown in FIG. 3. In FIG. 6, however, the discs are eccentrically mounted on the screw spindles. A spacer disc 27 is disposed on the screw core 13 and is aligned with the disc 26 mounted on the adjacent screw core 14 so that a space 28 is formed therebetween. A plurality of such aligned discs and spacer discs are provided alternately on each core 13 and 14.

The spaces 28 are thus staggered relative to one another in a manner similar to the spaces 17 to 22 inclusive shown in FIG. 2 whereby the melt is advanced in the conveying direction by the screws rotating in the same direction. At the same time, a large number of thin layers of the mixture are formed which results in enhanced longitudinal and transverse mixing.

In order to increase the conveying throughput of the two-point or three-point discs 23 and 24 respectively, their peripheral surfaces may be provided with grooves extending obliquely to the axes of the screws.

A comparison test was carried out utilizing an extrusion device in accordance with the present invention and an extrusion device disclosed in U.S. Pat. No. 3,453,356. The test was effected with high-density polyethylene which was introduced, in granular form, into the first filling aperture and which was in the form of a melt when it reached the region of the second filling aperture.

40% of free carbon black was then metered into the high-density polyethylene melt through the second filling aperture. Both extrusion devices had screws having a diameter of 60 mm. The prior art device had a length equal to twenty times the diameter of the screws while the device according to the present invention had a length equal to ten times the diameter of the screws. The rotational speed of the screws was set at 300 revolutions per minute and a throughput of 80 kg per hour was measured in the prior art device. The homogeneity of the mixture produced by the prior art device was unsatisfactory, so that only low-quality injection molded articles could be made from it.

An output of 198 kg per hour was, however achieved in the device according to the present invention which was provided with discs having a thickness equal to three-quarters of the screw diameter. In particular, the homogeneity of the mixture of plastics material was excellent, this being established when a plastics foil having a thickness of 25 m$\mu$ was produced therefrom by blow molding.

I claim:

1. A twin-screw extrusion device for incorporating pulverulent or fibrous additives in a melt of a thermoplastic plastics material comprising:
   (a) twin barrels, and a screw shaft mounted for rotation in each barrel, each barrel having an internal wall surface defining a first throughbore into which plastics material is introduced and a second throughbore downstream of said first throughbore,
   (b) a screw mounted on each shaft in said first and second throughbores, said screw comprising a core and flight means helically disposed about the periphery of said core,
   (c) a fist feed aperture for introducing plastics material into said first throughbore,
   (d) a second feed aperture downstream of said first feed aperture for introducing a pulverulent additive into the barrels, the core and flight means of each screw being discontinuous in the region of the barrels immediately below said second feed aperture,
   (e) an intake and metering zone defined by said first throughbores of said barrels between said first and second feed apertures, said thermoplastic material being fused in said intake and metering zone,
   (f) a plurality of alternately mounted disc members and spacer discs on each shaft in the region below said second feed aperture,
   (g) each said disc member and spacer disc having first and second opposed major surfaces, said first major surface being downstream of said second major surface,
   (h) the first major surfaces of each disc member being formed with conveying profiles by means of which conveyance of the plastics material in a downstream direction is enhanced,
   (i) each of said disc members having a major dimension substantially equal to the overall diameter of said screw flight,
   (j) each of said spacer members having a major dimension substantially equal to the diameter of said screw core, and wherein,
   (k) the thickness of each of said disc members and spacer discs measured from said first major surface to said second major surface lies in the range of 0.1 to 1.5 times the screw diameter.

2. An extrusion device as recited in claim 1, wherein said second feed aperture has a length which lies in the range of from 0.5 to 3 times said screw diameter.

3. An extrusion device as recited in claim 1, wherein said disc members on one screw shaft intermesh with said disc members mounted on the other screw shaft, and wherein said disc members mounted on screw shafts are axially aligned with said spacer discs mounted on said screw shafts.

4. An extrusion device as recited in claim 3, wherein said disc members have a two-pointed, substantially ellipsoid shape.

5. An extrusion device as recited in claim 3, wherein said disc members have a three-pointed, substantially triangular shape.

6. An extrusion device as recited in claim 3, wherein said disc members have a substantially circular shape and are eccentrically mounted on said associated shaft.

7. An extrusion device as recited in claim 1, wherein said conveying profiles comprise obliquely extending grooves communicating with the major surfaces of said disc members.

8. An extrusion device as recited in claim 3, wherein said conveying profiles comprise axially extending grooves formed around the periphery of said disc members.

* * * * *